(12) United States Patent
Kobayashi

(10) Patent No.: US 7,405,719 B2
(45) Date of Patent: Jul. 29, 2008

(54) USING PACKET TRANSFER FOR DRIVING LCD PANEL DRIVER ELECTRONICS

(75) Inventor: Osamu Kobayashi, Los Alto, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 425 days.

(21) Appl. No.: 10/909,103

(22) Filed: Jul. 29, 2004

(65) Prior Publication Data

US 2005/0062711 A1  Mar. 24, 2005

Related U.S. Application Data

(60) Provisional application No. 60/504,060, filed on Sep. 18, 2003, provisional application No. 60/474,085, filed on May 28, 2003, provisional application No. 60/474,084, filed on May 28, 2003, provisional application No. 60/467,804, filed on May 1, 2003.

(51) Int. Cl.
*G09G 3/36* (2006.01)
(52) U.S. Cl. .......................................... 345/98; 375/219
(58) Field of Classification Search .................. 345/98, 345/204, 690, 100; 375/219; 713/320; 714/758
See application file for complete search history.

(56) References Cited

U.S. PATENT DOCUMENTS

| | | |
|---|---|---|
| 4,796,203 A | 1/1989 | Roberts |
| 5,541,919 A | 7/1996 | Yong et al. |
| 5,608,418 A | 3/1997 | McNally |
| 5,615,376 A | 3/1997 | Ranganathan |
| 5,625,379 A | 4/1997 | Reinert et al. |
| 5,629,715 A | 5/1997 | Zenda |
| 5,739,803 A * | 4/1998 | Neugebauer .................. 345/98 |
| 5,745,837 A | 4/1998 | Fuhrmann |
| 5,790,083 A | 8/1998 | Bassetti |
| 5,805,173 A | 9/1998 | Glennon et al. |
| 5,852,630 A * | 12/1998 | Langberg et al. ............ 375/219 |
| 5,909,465 A | 6/1999 | Bottomley et al. |

(Continued)

FOREIGN PATENT DOCUMENTS

EP    0 354 480 A    2/1990

(Continued)

OTHER PUBLICATIONS

Bloks, RHJ, "The IEEE-1934 high speed serial bus," Philips Journal of Research, Elsevier, Amsterdam, NL, vol. 50, No. 1, 1996, pp. 209-216, XP004008212 ISSN: 0165-5817.

(Continued)

*Primary Examiner*—Richard Hjerpe
*Assistant Examiner*—Shaheda A Abdin
(74) *Attorney, Agent, or Firm*—Beyer Law Group LLP

(57) ABSTRACT

In a digital display device, a packet based method of driving selected pixel elements by way of associated data latches included in a column driver is disclosed. For each frame lines in a video frame, a number of video data packets are provided directly to the column driver at a link rate and each of the number of data latches are populated with appropriate video data based upon video data packets within a line period τ. Selected pixel elements are driven based upon the video data.

21 Claims, 7 Drawing Sheets

U.S. PATENT DOCUMENTS

| | | | |
|---|---|---|---|
| 5,918,002 A | 6/1999 | Klemets et al. | |
| 5,926,155 A | 7/1999 | Arai et al. | |
| 5,940,137 A | 8/1999 | Hulvey | |
| 5,949,437 A | 9/1999 | Clark | |
| 6,020,901 A | 2/2000 | Lavelle et al. | |
| 6,038,000 A | 3/2000 | Hurst, Jr. | |
| 6,151,334 A | 11/2000 | Kim et al. | |
| 6,151,632 A | 11/2000 | Chaddha et al. | |
| 6,154,225 A | 11/2000 | Kou et al. | |
| 6,175,573 B1 | 1/2001 | Togo et al. | |
| 6,223,089 B1 | 4/2001 | Page | |
| 6,249,319 B1 | 6/2001 | Post | |
| 6,326,961 B1 | 12/2001 | Lin et al. | |
| 6,337,964 B2 | 1/2002 | Inami et al. | |
| 6,353,594 B1 | 3/2002 | Tooker et al. | |
| 6,356,260 B1 | 3/2002 | Montalbo | |
| 6,437,768 B1 * | 8/2002 | Kubota et al. | 345/100 |
| 6,446,130 B1 | 9/2002 | Grapes | |
| 6,477,252 B1 | 11/2002 | Faber et al. | |
| 6,577,303 B2 | 6/2003 | Kim | |
| 6,587,480 B1 | 7/2003 | Higgins et al. | |
| 6,608,828 B1 | 8/2003 | Balachandran | |
| 6,614,800 B1 | 9/2003 | Genty et al. | |
| 6,661,422 B1 | 12/2003 | Valmiki et al. | |
| 6,697,376 B1 | 2/2004 | Son et al. | |
| 6,765,931 B1 | 7/2004 | Rabenko et al. | |
| 6,865,188 B1 | 3/2005 | Stirling et al. | |
| 6,909,442 B2 * | 6/2005 | Hiyama et al. | 345/690 |
| 6,914,637 B1 | 7/2005 | Wolf et al. | |
| 6,963,968 B2 | 11/2005 | Kori | |
| 7,075,987 B2 | 7/2006 | Kim et al. | |
| 2001/0030649 A1 | 10/2001 | Mamiya et al. | |
| 2001/0038387 A1 | 11/2001 | Tomooka et al. | |
| 2002/0007452 A1 | 1/2002 | Traw et al. | |
| 2002/0011996 A1 | 1/2002 | Inoue et al. | |
| 2002/0062394 A1 | 5/2002 | Bunn et al. | |
| 2002/0071390 A1 | 6/2002 | Reeves et al. | |
| 2002/0075902 A1 | 6/2002 | Abbas et al. | |
| 2002/0085582 A1 | 7/2002 | Kim | |
| 2002/0089517 A1 | 7/2002 | Ludtke et al. | |
| 2002/0122515 A1 | 9/2002 | Bodenschatz | |
| 2002/0136219 A1 | 9/2002 | Ding et al. | |
| 2002/0149617 A1 | 10/2002 | Becker | |
| 2002/0163598 A1 | 11/2002 | Pasqualino | |
| 2002/0164022 A1 | 11/2002 | Strasser et al. | |
| 2002/0190974 A1 | 12/2002 | Morita | |
| 2002/0190978 A1 | 12/2002 | Agarwal et al. | |
| 2003/0048852 A1 | 3/2003 | Hwang et al. | |
| 2003/0063077 A1 | 4/2003 | Koyama | |
| 2003/0076282 A1 | 4/2003 | Ikeda et al. | |
| 2003/0080971 A1 | 5/2003 | Hochmuth et al. | |
| 2003/0112822 A1 | 6/2003 | Hong et al. | |
| 2003/0145258 A1 | 7/2003 | Warner et al. | |
| 2003/0149987 A1 | 8/2003 | Pasqualino et al. | |
| 2003/0152160 A1 | 8/2003 | Bauch et al. | |
| 2003/0174156 A1 | 9/2003 | Katsuhara et al. | |
| 2003/0212811 A1 | 11/2003 | Thornton | |
| 2004/0049705 A1 * | 3/2004 | Liebenow | 713/320 |
| 2004/0080671 A1 | 4/2004 | Siemens et al. | |
| 2004/0088469 A1 | 5/2004 | Levy | |
| 2004/0103333 A1 | 5/2004 | Martwick et al. | |
| 2004/0114607 A1 | 6/2004 | Shay et al. | |
| 2004/0210805 A1 | 10/2004 | Kimelman et al. | |
| 2004/0218598 A1 | 11/2004 | Kobayashi | |
| 2004/0218599 A1 | 11/2004 | Kobayashi | |
| 2004/0218624 A1 | 11/2004 | Kobayashi | |
| 2004/0218625 A1 | 11/2004 | Kobayashi | |
| 2004/0218627 A1 | 11/2004 | Kobayashi | |
| 2004/0221056 A1 | 11/2004 | Kobayashi | |
| 2004/0221312 A1 | 11/2004 | Kobayashi | |
| 2004/0221315 A1 | 11/2004 | Kobayashi | |
| 2004/0228365 A1 | 11/2004 | Kobayashi | |
| 2004/0233181 A1 | 11/2004 | Kobayashi | |
| 2004/0243905 A1 * | 12/2004 | Merritt | 714/758 |
| 2005/0062699 A1 | 3/2005 | Kobayashi | |
| 2005/0066085 A1 | 3/2005 | Kobayashi | |
| 2005/0103333 A1 | 5/2005 | Bonutti | |
| 2007/0140298 A1 | 6/2007 | Eng | |

FOREIGN PATENT DOCUMENTS

| | | |
|---|---|---|
| EP | 0 385 449 A1 | 9/1990 |
| EP | 0 674 440 A2 | 9/1995 |
| EP | 0 674 441 A1 | 9/1995 |
| EP | 078 8048 | 6/1997 |
| EP | 1 041 823 A2 | 10/2000 |
| EP | 1 069 721 A2 | 1/2001 |
| EP | 1 089 503 | 4/2001 |
| EP | 1 154 354 A | 11/2001 |
| EP | 1 229 690 A | 8/2002 |
| EP | 1 251 664 A2 | 10/2002 |
| EP | 1 517 292 A2 | 3/2005 |
| EP | 1 519 349 A2 | 3/2005 |
| EP | 1 519 581 A1 | 3/2005 |
| GB | 2 329 741 A | 3/1999 |
| JP | 03-153299 | 7/1991 |
| JP | 10145309 | 5/1998 |
| JP | 11175045 | 7/1999 |
| JP | 2001 218082 | 8/2001 |
| JP | 2001036900 | 9/2001 |
| JP | 2002 304168 | 10/2002 |
| SG | 110144 | 4/2005 |
| WO | WO95/00917 | 1/1995 |
| WO | 95/13681 | 5/1995 |
| WO | WO 98/41008 | 9/1998 |
| WO | WO 99/63513 | 12/1999 |
| WO | WO00/20974 | 4/2000 |
| WO | 02/25822 A2 | 3/2002 |
| WO | WO 03/058376 | 7/2003 |

OTHER PUBLICATIONS

Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.

International Search Report dated Jun. 14, 2006 from European Patent Application No. 04252055.1.

Jun Hanari and Manabu Watanabe et al., "15.2: Development of an UXGA Display System by an Digital Packet Video Link," SID 01 Digest, vol. XXXII, Jun. 5, 2001, pp. 210-213, XP007007646, paragraphs 0001-0003.

Kasai N et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.

International Search Report dated Oct. 7, 2005 from Singapore Patent Application No. 200405129-8.

International Search Report dated Dec. 2, 2005 from European Patent Application No. 04255610.0.

Chang et al., "Digital Visual Interface," Technology Brief, Dell, May 2000.

Office Action mailed Dec. 5, 2006 from U.S. Appl. No. 10/726,802.
Office Action mailed Jul. 9, 2007 from related U.S. Appl. No. 10/726,895.
Office Action mailed Jun. 27, 2007 from U.S. Appl. No. 10/726,794.
Office Action mailed Dec. 28, 2007 from U.S. Appl. No. 10/726,895.
Office Action mailed Nov. 26, 2007 from U.S. Appl. No. 10/909,027.
Notice of Allowance mailed Sep. 24, 2007 from U.S. Appl. No. 10/726,802.
Supplemental Notice of Allowance mailed Nov. 6, 2007 from U.S. Appl. No. 10/726,802.

Office Action mailed Nov. 27, 2007 from U.S. Appl. No. 10/726,794.
International Search Report in related Chinese Application No. 200410044503.5 dated Jun. 29, 2007.
High-bandwidth Digital Content Protection System, Revision 1.0, Intel Corporation, Feb. 17, 2000.

EPO Exam Report in EP Application No. 04255786.8 dated Jul. 5, 2007.
Office Action mailed Jun. 26, 2007 from U.S. Appl. No. 10/762,680.

* cited by examiner

Main Link Packet Format

High-level diagram of link traffic example

US 7,405,719 B2

USING PACKET TRANSFER FOR DRIVING LCD PANEL DRIVER ELECTRONICS

CROSS REFERENCE TO RELATED APPLICATIONS

This patent application takes priority under 35 U.S.C. 119(e) to (i) U.S. Provisional Patent Application No.: 60/467,804, filed on May 1, 2003 entitled "DIGITAL/ANALOG VIDEO INTERCONNECT AND METHODS OF USE THEREOF" by Kobayashi, (ii) U.S. Provisional Patent Application No.: 60/504,060 filed on Sep. 18, 2003, entitled "DIGITAL/ANALOG VIDEO INTERCONNECT AND METHODS OF USE THEREOF" by Kobayashi, (iii) U.S. Provisional Patent Application No.: 60/474,085 filed on May 28, 2003, entitled "DIGITAL/ANALOG VIDEO INTERCONNECT AND METHODS OF USE THEREOF" by Kobayashi, and (iv) U.S. Provisional Patent Application No.: 60/474,084 filed on May 28, 2003, entitled "SIMPLE ENUMERATION METHOD FOR THE LINK CLOCK RATE AND THE PIXEL/AUDIO CLOCK RATE" by Kobayashi each of which are hereby incorporated by reference herein in their entirety. This application is also related to the following co-pending U.S. patent applications, which are filed concurrently with this application and each of which are herein incorporated by reference, (i) U.S. patent application Ser. No. 10/726,802, entitled "METHOD OF ADAPTIVELY CONNECTING A VIDEO SOURCE AND A VIDEO DISPLAY" naming Kobayashi as inventor; (ii) U.S. patent application Ser. No. 10/726,438, entitled "METHOD AND APPARATUS FOR EFFICIENT TRANSMISSION OF MULTIMEDIA DATA PACKETS" naming Kobayashi as inventor; (iii) U.S. patent application Ser. No. 10/726,794, entitled "PACKET BASED VIDEO DISPLAY INTERFACE AND METHODS OF USE THEREOF", naming Kobayashi as inventor; (iv) U.S. patent application Ser. No. 10/726,440, entitled "PACKET BASED MONITOR TRAINING IN A VIDEO SYSTEM", naming Kobayashi as inventor; (v) U.S. patent application Ser. No. 10/726,350, entitled "TECHNIQUES FOR REDUCING MULTIMEDIA DATA PACKET OVERHEAD", naming Kobayashi as inventor; (vi) U.S. patent application Ser. No. 10/726,362, entitled "PACKET BASED CLOSED LOOP VIDEO DISPLAY INTERFACE WITH PERIODIC STATUS CHECKS", naming Kobayashi as inventor; (vii) U.S. patent application Ser. No. 10/726,895, entitled "MINIMIZING BUFFER REQUIREMENTS IN A DIGITAL VIDEO SYSTEM", naming Kobayashi as inventor; (viii) U.S. patent application Ser. No. 10/726,441, entitled "VIDEO INTERFACE ARRANGED TO PROVIDE PIXEL DATA INDEPENDENT OF A LINK CHARACTER CLOCK", naming Kobayashi as inventor; and (ix) U.S. patent application Ser. No. 10/726,934, entitled "ENUMERATION METHOD FOR THE LINK CLOCK RATE AND THE PIXEL/AUDIO CLOCK RATE" issued as U.S. Pat. No.: 6,992,987, naming Kobayashi as inventor. This application is also related to the following co-pending applications: (x) U.S. patent application Ser. No. 10/909,085, entitled "PACKET BASED STREAM TRANSPORT SCHEDULER AND METHODS OF USE THEREOF" filed Jul. 29, 2004, naming Kobayashi as inventor, and (xi) U.S. Pat. No.: 7,088,741.

BACKGROUND

I. Field of the Invention

The invention relates to display devices. More specifically, the invention describes a method and apparatus for using driving LCD panel drive electronics.

II. Overview

Liquid Crystal Displays (LCDs) have begun to supersede Cathode Ray Tube (CRT) based monitors in the monitor and television applications markets due in part to the fact that LCDs have several advantages compared to CRT based technology. These advantages include smaller size (60% less than comparable CRTs), lower power consumption (50%), lighter weight (70% less than CRT), no electromagnetic fields, and longer service life.

FIG. 1 is a block diagram showing an example of a conventional active matrix liquid crystal display device 100 that includes a liquid crystal display panel 102, a data (or a column) driver 104 that includes a number of data latches 106-1 through 106-n suitable for storing image data, a gate driver 108 that includes gate driver logic circuits 110, a timing controller unit (also referred to as a TCON) 112, and a memory 114 suitable for storing image data included in or coupled to the TCON 112. In some cases, the memory 114 takes the form of a frame memory capable of storing an entire video frame or in other cases, the memory 114 takes the form of a line buffer capable of storing a single line of video data. In either case, the image data is stored in the memory 114 in such a way as to be available to be transferred to the latches 106 one frame line at a time within a period of time referred to as a line period τ. As shown, a pixel clock generator unit 116 also included in or coupled to the TCON 112 is used to convert video data delivered at a link clock rate to the required pixel clock rate.

Typically, the TCON 112 is connected to a video source 128 (such as a personal computer, TV or other such device) suitably arranged to output a video signal (and, in most cases, an associated audio signal). During operation, the TCON 112 sends video data one pixel at a time by way of a multidrop bus 130 to be stored in a correspondingly enabled one of the data latches 106. For example, if the display panel has 1024 pixels per line then there are 1024 latches per line (it should be noted that in the case of a full color display, each pixel is formed of 3 subpixels, Red, Green, and Blue and therefore there are a total of 1024×3=3072 data latches) each of which is connected to the multidrop data bus 130. When the TCON 112 is loading the video data, a first latch receives a latch enable signal and stores the appropriate pixel data, after which a second latch receives the latch enable signal and stores the appropriate pixel data and so on until all 3072 latches have been enabled and stored the appropriate pixel data one at a time. In this way, for each frame line, the TCON 112 must send the all pixel data to the appropriate one of the 3072 data latches within the line period τ. Once all the video data for a particular frame line has been received and latched, the video data is then available to drive selected ones of a number of picture elements 118 included in the LCD array 102 used to form the displayed image.

Therefore, in order for the TCON 112 to provide the correct pixel data to the correct data latch, the TCON 112 must provide a handshake enable signal between each data latch 106 that must propagate from the leftmost data latch 106-1 to the rightmost data latch 106-n in such a way that all video data for a particular frame line is stored with the line period τ. Since even the rightmost data latch 106-n must be driven by the TCON 112, the number of pixels per line is limited by the ability of the TCON 112 to adequately drive the rightmost (and therefore most distant) data latch 106-n. The large number of components (3072 in the case of an 1024 RGB display) coupled to the large multidrop bus 130 presents a severe challenge to the TCON 112 to preserve signal integrity. Since signal integrity is crucial to the proper operation of the display 100, the data rate is typically reduced thereby severely limiting the resolution of the display 100 since all data for a single frame line must be transferred to all data latches 106 within a single line period τ which is typically about 20 microseconds.

One approach to solving this problem is to increase the size of the multidrop bus 130 that unfortunately also increases the line capacitance making it difficult to optimize the transmission of the data on the bus. Other approaches (such as reduced swing differential signaling or RSDS) use multiple busses with 2 pixels per clock instead of a single multidrop bus and a single pixel per clock. Although this approach reduces the drive capability required for the TCON 112, it has the unfortunate result of substantially increasing the complexity of the TCON driving circuitry (as well as doubling the number of pins). For example, in the case of 24 bit color, the RSDS approach would require 24 transmission lines in addition to a dedicated clock line greatly increasing the complexity of the LCD column driver 104.

Therefore a high speed, high bandwidth approach to driving an digital display is needed.

SUMMARY OF THE INVENTION

What is provided is a display architecture embodied as a method, apparatus, and system suitable for implementation with digital displays, such as liquid crystal displays (LCDs), that is independent of pixel rate and provides a high speed, high bandwidth digital display platform.

In a digital display device, a packet based method of driving selected pixel elements by way of associated data latches included in a column driver is disclosed. For each frame lines in a video frame, a number of video data packets are provided directly to the column driver at a link rate and each of the number of data latches are populated with appropriate video data based upon video data packets within a line period τ. Selected pixel elements are driven based upon the video data.

In another embodiment, a digital display device is disclosed that includes a number of pixel elements, an interface arranged to receive and distribute video data packets at a link rate, and a number of data latches each of which are arranged to receive a distributed video data packet from the interface, store video data associated with the received video data packet, and drive selected ones of the pixel elements based upon stored video data.

In yet another embodiment, computer program product for driving selected pixel elements by way of associated data latches included in a column driver In a packet based digital display device is disclosed. Computer code for providing a number of video data packets directly to the column driver at a link rate, computer code for populating each of the number of data latches with appropriate video data based upon video data packets within a line period τ, computer code for driving selected pixel elements based upon the video data, and computer readable medium for storing the computer code

DETAILED DESCRIPTION OF SELECTED EMBODIMENTS

Figure 1:
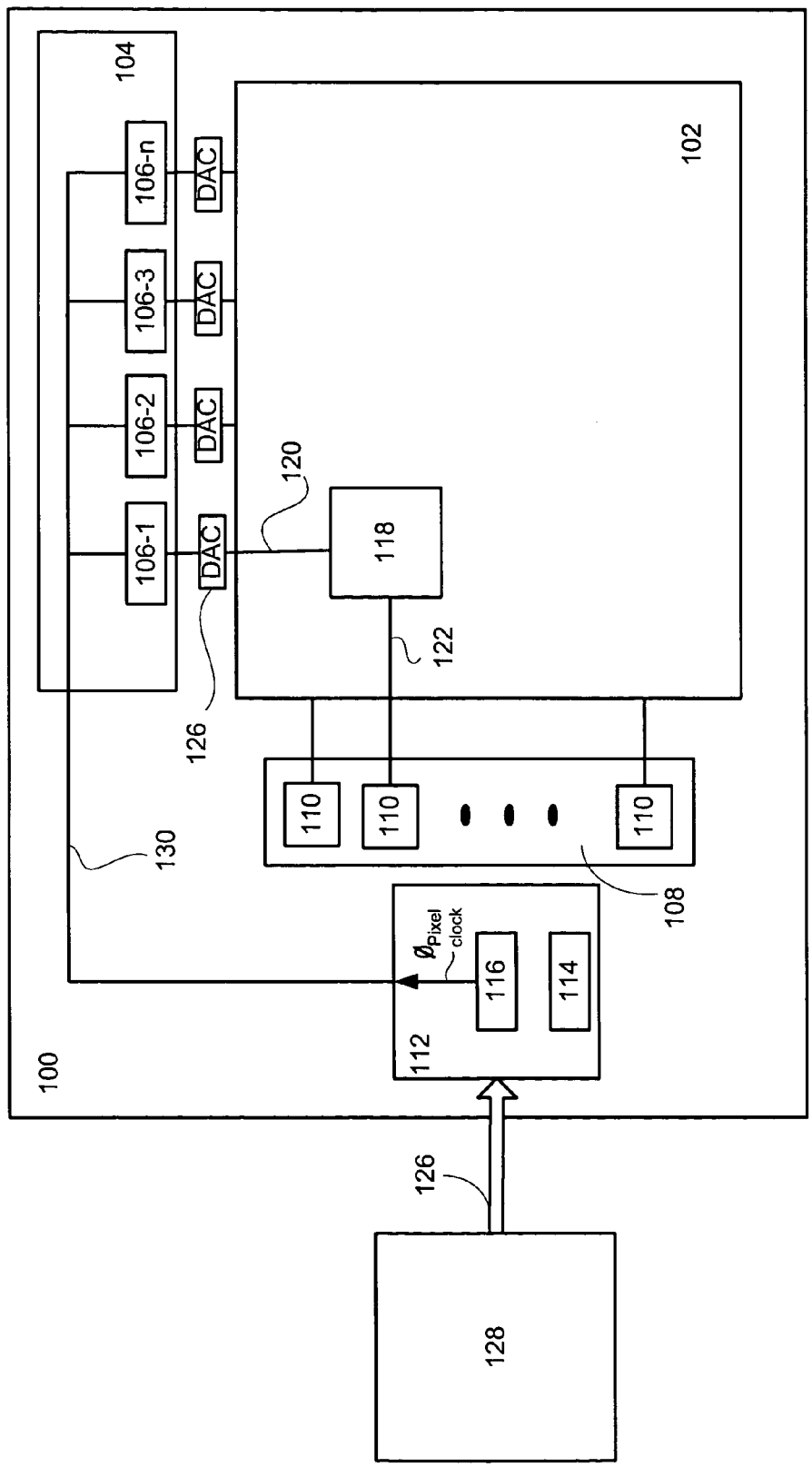
FIG. 1 is a block diagram showing an example of a conventional active matrix liquid crystal display device.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

In order for conventionally configured digital display devices, such as LCD panels, to display images, a timing controller must propagate video data (in the form of pixel data at a pixel clock) from a first (typically a leftmost data latch) to a last (typically a rightmost data latch) in such a way that all video data for a particular frame line is stored with a single line period τ (usually about 20 microseconds). Since even the last data latch must be driven by the timing controller, the number of pixels per line is limited by the ability of the timing controller to adequately drive the rightmost (and therefore most distant) data latch within the specified line period τ. As the resolution of a display increases (3072 data latches in the case of a 1024 RGB display), the ability of the timing controller to adequately drive a multidrop bus coupled thereto becomes progressively more difficult and problematic to preserve signal integrity. Since signal integrity is crucial to the proper operation of the display, the data rate is typically reduced thereby severely limiting the resolution of the display since all data for a single frame line must be transferred to all data latches within a single line period τ which is typically about 20 microseconds.

One approach to solving this problem is to increase the size of the multidrop bus that unfortunately also has the effect of increasing the line capacitance making it difficult to optimize the transmission of the data on the bus. Other approaches (such as Reduced Swing Differential Signaling, or RSDS) use multiple busses with 2 pixels per clock instead of a single multidrop bus and a single pixel per clock. Although this approach reduces the drive requirements for the timing controller, it has the unfortunate result of substantially increasing the complexity of the timing controller driving circuitry (as well as doubling the number of pins). For example, in the case of 24 bit color, the RSDS approach requires that the data bus have at least 24 transmission lines in addition to a dedicated clock line thereby greatly increasing the complexity of the LCD column driver.

Accordingly, a packet based display architecture embodied as a method, apparatus, and system suitable for implementation with digital displays, such as liquid crystal displays (LCDs), that decouples the pixel rate from the line period τ, simplifies the column driver circuitry provides a high speed, high bandwidth digital display platform. The display architecture does away with the large data bus commonly used with conventional digital display architecture in favor of a point to point "daisy chain" configuration. In this configuration, a number of data latches consistent with a native horizontal line resolution of the display are directly connected to each other. In this way, the video data packets are transported and received at a link data rate and not as required in conventional display architectures, at the pixel data rate.

In this way, the complexity of the LCD driver circuitry is greatly simplified since there is no requirement for pixel clock regeneration (such as time based recovery) and the size of the data bus is greatly reduced since the data packets themselves can be encoded to provide necessary timing and other signals heretofore provided by separate data lines in the data bus. In addition, the native line resolution of the display (i.e., the number of horizontal pixels) can be substantially increased without the concomitant increase in driver complexity or bus size since the only constraint is that all necessary video data be latched for a particular frame line within the line period $\tau$.

The invention will now be described in terms of a representative LCD panel. However, it should be noted that any digital fixed pixel display, be it LCD, plasma, DLP based, is also suitable and therefore the use of an LCD panel in the following description should not be considered to limit either the scope or the intent of the invention. It should be noted that the invention is also well suited to be used in conjunction with any packet based video display interface such as described in copending U.S. patent application Ser. No. 10/726,794 entitled "PACKET BASED VIDEO DISPLAY INTERFACE AND METHODS OF USE THEREOF" by Kobayashi filed Dec. 3, 2003 and incorporated herein by reference for all purposes.

Figure 2:
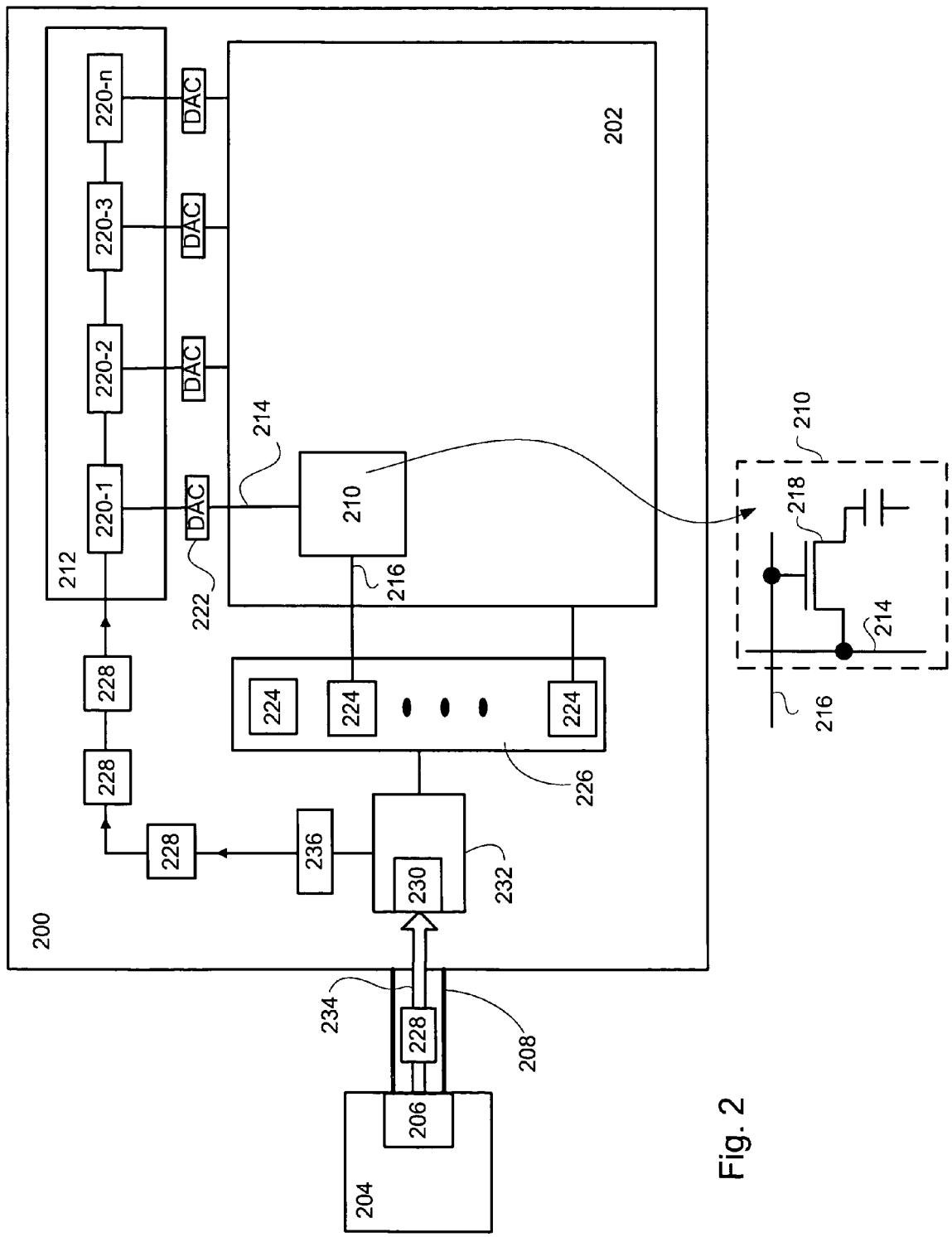
FIG. 2 shows an exemplary digital display system in accordance with an embodiment of the invention.

Accordingly, FIG. 2 shows an exemplary digital display system 200 in accordance with an embodiment of the invention. The system 200 includes a digital display unit 202 coupled to a video source 204 having a graphics engine 206 by way of a data link 208. It should be noted that the video source 204 can include either or both a digital image (i.e. still or digital video) source and/or an analog image (i.e., still or analog video) source. Accordingly, the video source 204 provides various video signals that can have any number and type of well-known formats, such as composite video, serial digital, parallel digital, RGB, or consumer digital video. The video signal can be an analog video signal provided the source 204 includes some form of an analog video source such as for example, an analog television, still camera, analog VCR, DVD player, camcorder, laser disk player, TV tuner, set top box (with satellite DSS or cable signal) and the like. The source 204 can also include a digital image source such as for example a digital television (DTV), digital still camera, and the like. The digital video signal can be any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video.

The LCD panel 202 includes a number of picture elements 210 (pixels) that are arranged in a matrix connected to a data driver 212 by way of a plurality of data lines 214 and a plurality of gate lines 216. In the described embodiment, these picture elements take the form of a plurality of thin film transistors (TFTs) 218 that are connected between the data lines 214 and the gate lines 216. During operation, each of data latch 220 outputs digital data signals to an associated digital to analog converter (DAC) 222 by way of the data lines 214. Concurrently, each of logic circuit 224 included in a gate driver 226 outputs a predetermined scanning signal to the gate lines 216 in sequence at timings which are in sync with a horizontal synchronizing signal. In this way, the TFTs 218 are turned ON when the predetermined scanning signal is supplied to the gate lines 214 to transmit the analog data signals supplied by the DACs 222 by way of the data lines 214 that ultimately drive selected ones of the picture elements 210.

When the graphics engine 206 includes or is coupled to an analog video source, the graphics engine 206 digitizes the analog data to form digital data that is then packetized into a number of data packets 228. In the described embodiment, each of the data packets are transmitted to the display 202 by way of the link 208 at a transmission rate referred to as a link rate LR that is independent of the native stream rates of the video data. It should be noted, however, that the bandwidth of the link 208 must be greater than the aggregate bandwidth of all data stream(s) being transmitted over the link 208. Regardless of the type of video source or display, however, all video data are digitized (if necessary) and, in most cases, packetized prior to transmission over the link 208. In some cases, however, using a packetizer 230 included in or coupled to a display interface 232, the display unit 202 itself will packetize any video and/or audio data transmitted over the link 208 in an unpacketized form thereby enabling the use of the display 202 with all video sources.

In the described embodiment, the speed, or link rate, of the link 208 can be configured to include a number of logical data channels (not shown) that can be adjusted to compensate for link conditions. For example, at 2.5 Gbps per channel, the link 208 can support SXGA 60 Hz with a color depth of 18 bits per pixel over a single channel. It should be noted that a reduction in the number of channels reduces not only the cost of interconnect, but also reduces the power consumption which is an important consideration (and desirable) for power sensitive applications such as portable devices and the like. However, by increasing the number of channels to four, the link 208 can support WQSXGA (3200×2048 image resolution) with a color depth of 24-bits per pixel at 60 Hz. or QSXGA (2560× 2048) with a color depth of 18-bits per pixel at 60 Hz, without data compression. Even at the lowest rate of 1.0 Gbps per channel, only two channels are required to support an uncompressed HDTV (i.e., 1080i or 720p) data stream.

Figure 3A:
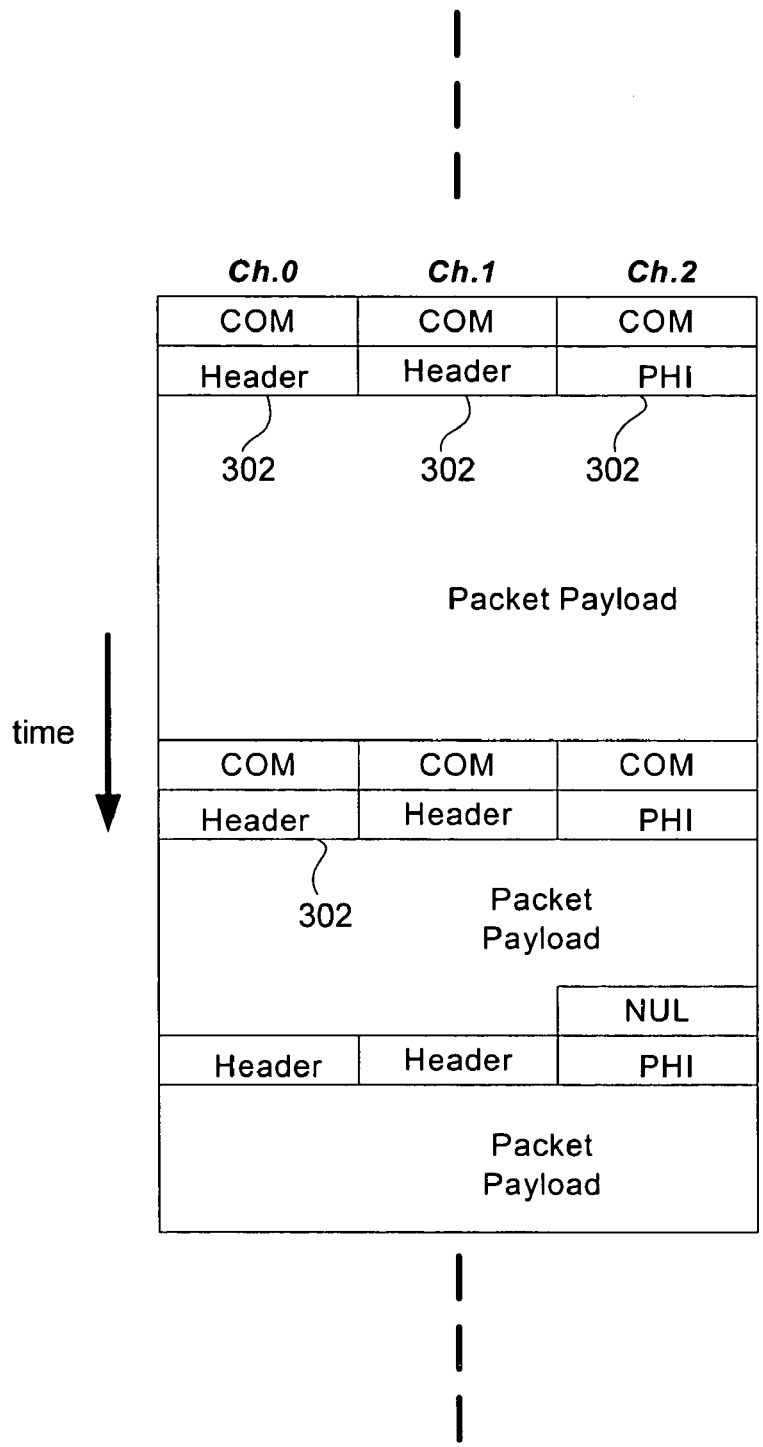
FIG. 3A shows a representative data packet in accordance with an embodiment of the invention.
Figure 3B:
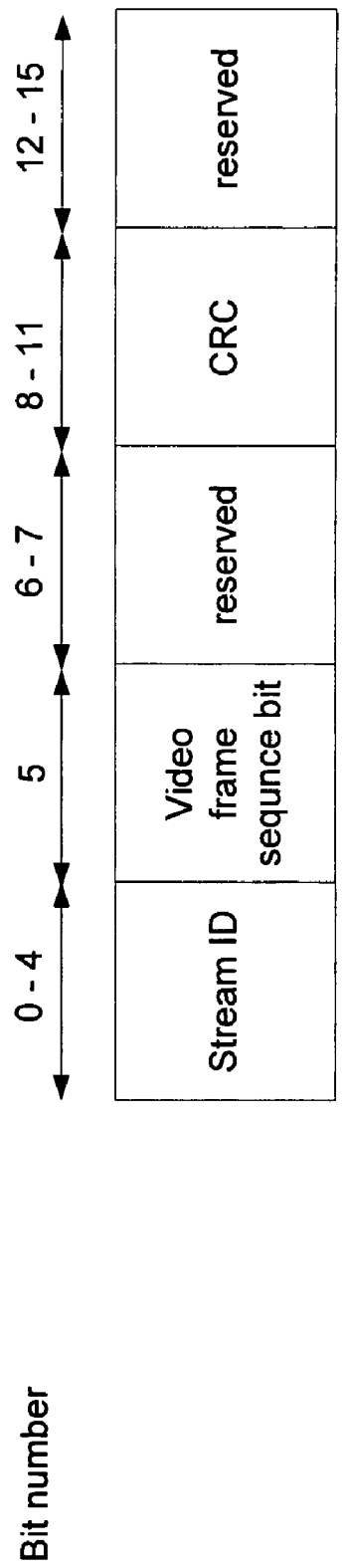
FIG. 3B shows a detailed view of the data packet shown in FIG. 3A.

A representative data packet 300 is shown in FIG. 3 includes a data packet header 302 that in one embodiment includes 16 bits where four bits are the Stream ID (SID), a fifth bit is a video frame sequence bit which acts as the least significant bit of the frame counter which toggles from "0" to "1" or from "1" to "0" at the video frame boundary (used only for uncompressed video stream. Sixth and seventh bits are reserved whereas the remaining bits include a 4-bit CRC (CRC) that checks errors for the previous eight bits.

In order to transmit the video data, the video source 204 forms a data stream 234 that includes a number of the data packets 228 which are then received and processed by the display interface 230. In the described embodiment, the data packets 228 are then forwarded to directly to the data latches 220 included in the column driver 212 in such a way that all the video data (in the form of pixel data) used for the display of a particular frame line n of the video frame is provided to the data latches 220 within a line period $\tau$. Therefore, once each data latch 220 has appropriate pixel data stored therein, the data driver 212 drive appropriate ones of the TFTs 218 in the LCD array 202.

Figure 4:
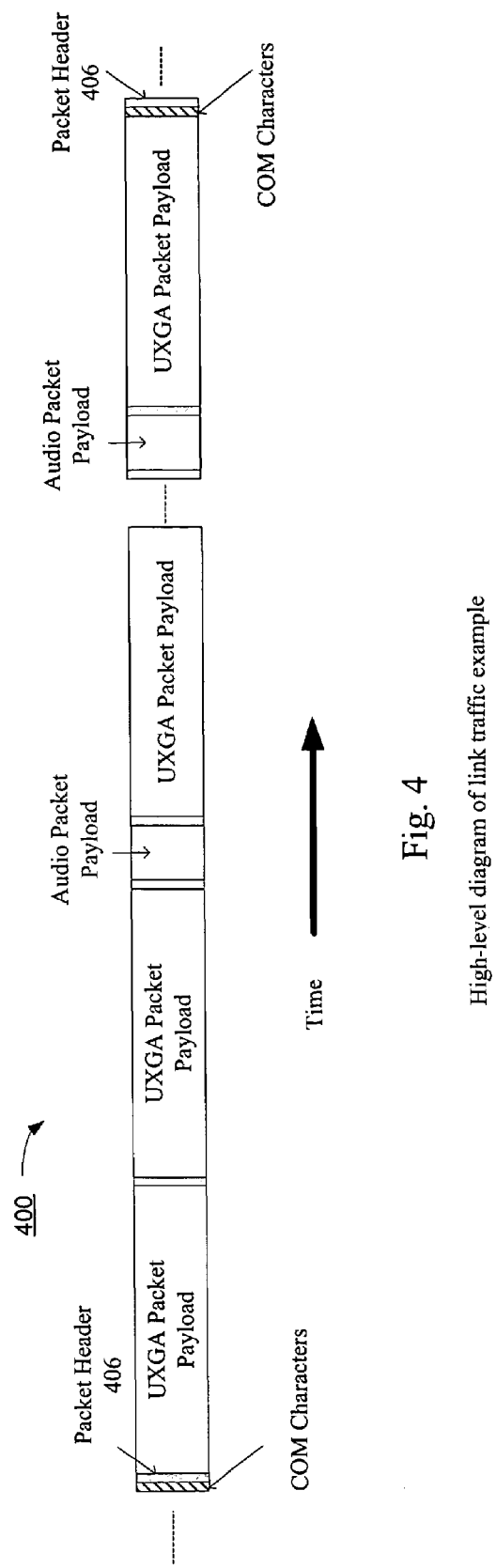
FIG. 4 shows a high-level diagram of a data stream for transmission over the link in accordance with an embodiment of the invention.

FIG. 4 shows a high-level diagram of a data stream 400 for transmission over the link 208 formed of a number of video data packets 402 and audio data packets 404 multiplexed into the single data stream 400. In this example the video data packets 402 are consistent with UXGA graphics 1280×720p video (Stream ID=1) having an associated audio in the form of the audio packets 404 (Stream ID=2). In this example, each frame line is formed of at least 1280 pixels (or 3840 sub-pixels) therefore requiring 3840 data latches be used to store a single frame line of video data within the line period τ. For example, in one embodiment, when the data stream 400 is received at the display interface 230, a group of 3840 data packets (as defined by corresponding packet headers 406) are stored in a memory 236 that can be either a frame memory or a line buffer. It should also be noted, however, that the memory 236 can be bypassed or be absent altogether if a strictly pipelined architecture is desired. In the pipelined architecture, the video source 204 would provide the necessary control signals and configure the data packets appropriately.

Returning to the described embodiment that includes the memory 236, once all 3840 data packets are properly stored in the memory 236 and accounted for, the stored data packets are then forwarded to the LCD column controller 212. The data packets 228 are then forwarded in a point to point fashion (also referred to as a daisy chain style) to the appropriate ones of the data latches 220 at which point each is depacketized such that the appropriate video data (or audio data) is stored in the appropriate data latch within one line period τ. At this point, the video data is ready to drive the appropriate ones of the pixel elements 210 located in the display 202 after processing by corresponding DACs 222. In this way, the number of lines required to provide the appropriate video data to the data latches 220 can be as low as 2 as opposed to approximately 24 in conventional LCD driver architectures.

Figure 5:
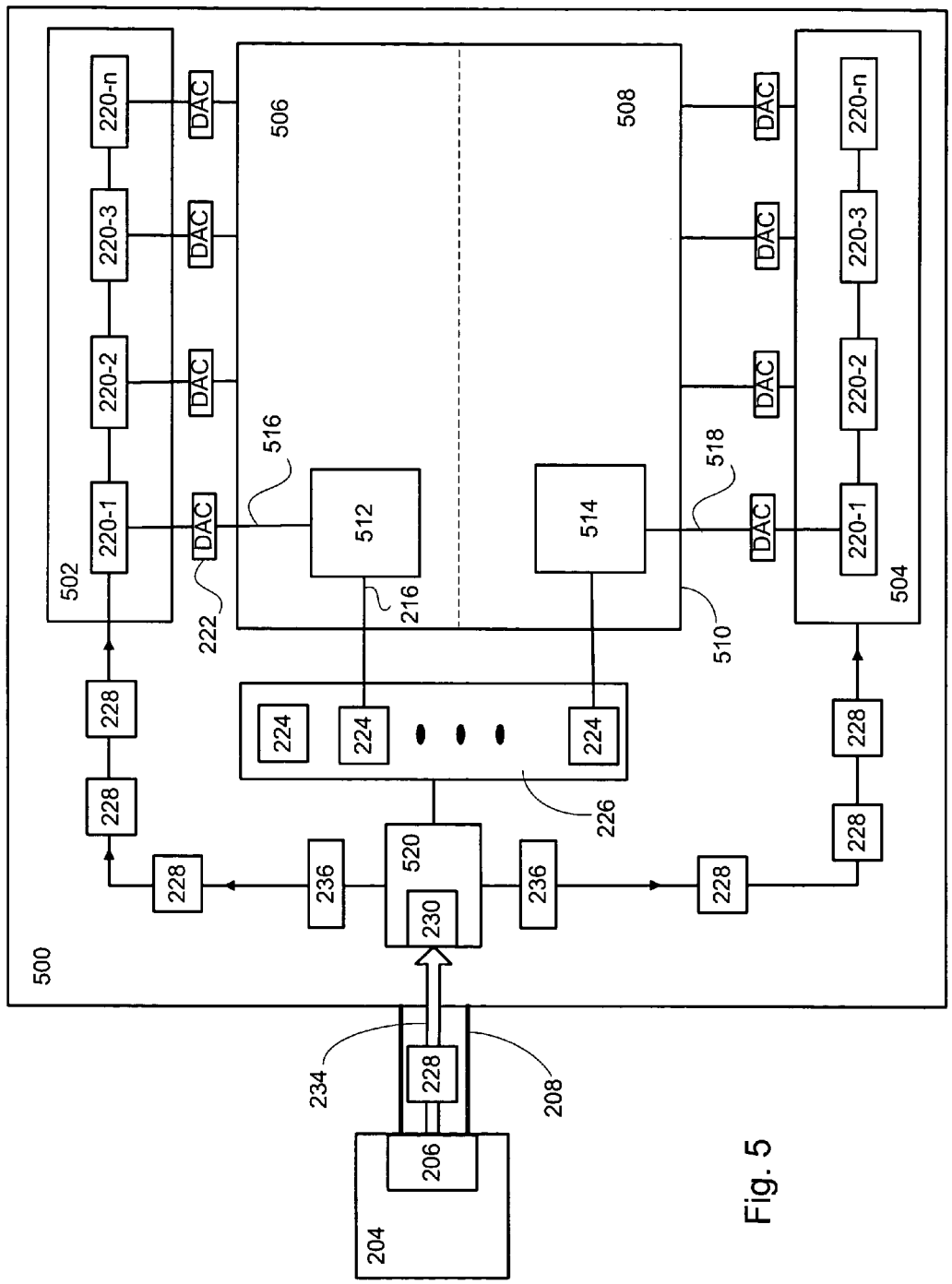
FIG. 5 shows an embodiment of the invention whereby a digital display unit includes two column drivers each of which is used to drive pixels in corresponding portions of a partitioned display.

FIG. 5 shows an embodiment of the invention whereby a digital display unit 500 includes two column drivers 502 and 504 each of which is used to drive pixels in corresponding portions 506 and 508 of a partitioned display 510. By dividing the display 510 into the portions 506 and 508, each of the column drivers 502 and 504 require substantially less current to drive the corresponding picture elements 512 and 514 (which may include, for example, TFTs 218 described earlier) since the parasitic capacitance due to the reduced length of the data lines 516 and 518 are commensurably reduced.

Figure 6:
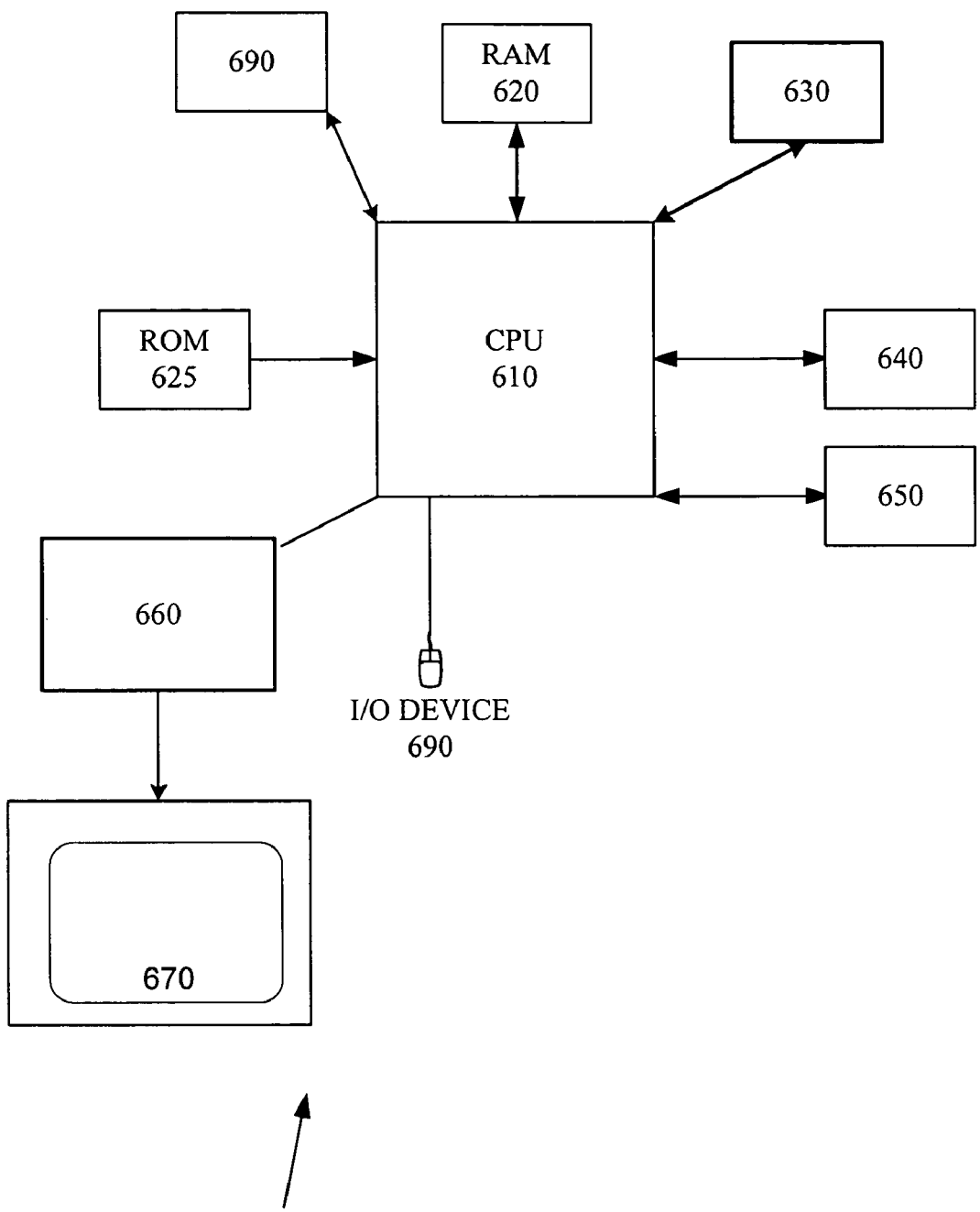
FIG. 6 illustrates a system that can be used to implement the invention.

FIG. 6 illustrates a system 600 that can be used to implement the invention. The system 600 is only an example of a graphics system in which the present invention can be implemented. System 600 includes central processing unit (CPU) 610, random access memory (RAM) 620, read only memory (ROM) 625, one or more peripherals 630, graphics controller 660, primary storage devices 640 and 650, and digital display unit 670. CPU 610 is also coupled to one or more input/output devices 690. Graphics controller 660 generates image data and corresponding reference signals, and provides both to digital display unit 670. The image data can be generated, for example, based on pixel data received from CPU 610 or from an external circuitry.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. In a digital display device connected by way of a communication link to a video source, a packet based method of driving selected pixel elements by way of a number of data latches consistent with a native horizontal line resolution of the display included in a column driver, comprising:
    (a) providing an input video stream in the form of a number of video data packets from the video source directly to the column driver at a link rate over the communication link;
    (b) populating each of the number of data latches with appropriate video data based upon video data packets within a line period τ, wherein since the data latches are directly connected to each other in a point to point daisy chain configuration any requirement for a pixel clock at the display is eliminated and wherein the digital display does not include a timing controller and wherein the digital display device does not apply any timing adjustment to the input video stream;
    (c) driving selected pixel elements based upon the video data; and
    (d) repeating (a)-(c) for all frame lines in a video frame.

2. A method as recited in claim 1, further comprising:
    generating a video signal at a video source coupled to the digital display device by way of a link;
    forming a packet based video stream based upon the video signal; and
    transmitting the packet based video stream to the digital display device by way of the link at the link rate.

3. A method as recited in claim 2, wherein the digital display device includes a memory device coupled to the link suitably arranged to store selected ones of the video data packets prior to the providing (a).

4. A method as recited in claim 3 wherein the memory device is a line buffer arranged to store at least a quantity of video data packets consistent with a single frame line.

5. A method as recited in claim 1, wherein each of the video data packets includes a packet header and a packet payload, wherein the packet header includes a packet ID and wherein the packet payload includes video data suitable for driving a corresponding pixel.

6. A digital display device, comprising:
    a number of pixel elements;
    an interface arranged to receive and distribute video data packets at a link rate; and
    a number of data latches connected to each other in a point to point daisy chain configuration; each of which are arranged to receive a video data packet from an input video stream directly from the interface, store video data associated with the received video data packet, and drive selected ones of the pixel elements based upon stored video data wherein since the data latches are directly connected to each other in a point to point daisy chain configuration any requirement for a pixel clock at the display device is eliminated and wherein the digital display does not include a timing controller and wherein the digital display device does not apply any timing adjustment to the input video stream.

7. A display as recited in claim 6, wherein selected ones of the number of data latches are populated with appropriate video data within a line period τ corresponding to a scan line in a video frame.

8. A display as recited in claim 7, wherein the pixel elements are arranged in rows and columns.

9. A display as recited in claim 8, wherein each of the columns of pixels are associated with a column driver unit arranged to provide a display signal.

10. A display unit as recited in claim 9, wherein each of the column driver units includes a subset of the number of data latches.

11. A display unit as recited in claim 10, wherein the video data packets are sent directly to the column drivers at the link rate.

12. A display unit as recited in claim 11, wherein a number of scan lines times the line period is less than or equal to a video frame period.

13. A display as recited in claim 12, wherein the display is connected by way of a link to a video source wherein the video source forms a packet based video stream and transmits the packet based video stream to the digital display by way of the link at the link rate.

14. A display as recited in claim 13, wherein the digital display device includes a memory device coupled to the link suitably arranged to store selected ones of the video data packets.

15. A display as recited in claim 14 wherein the memory device is a line buffer arranged to store at least a quantity of video data packets consistent with a single frame line.

16. A display as recited in claim 15, wherein each of the video data packets includes a packet header and a packet payload, wherein the packet header includes a packet ID and wherein the packet payload includes video data suitable for driving a corresponding pixel.

17. Computer program product for driving selected pixel elements included in a digital display by way of associated data latches included in a column driver, comprising:

computer code for providing an input video stream in the form of a number of video data packets from the video source directly to the column driver at a link rate;

computer code for populating each of the number of data latches with appropriate video data based upon video data packets within a line period $\tau$, wherein since the data latches are directly connected to each other in a point to point daisy chain configuration any requirement for a pixel clock at the display is eliminated and wherein the digital display does not include a timing controller and wherein the digital display device does not apply any timing adjustment to the input video stream;

computer code for driving selected pixel elements based upon the video data; and computer readable medium for storing the computer code.

18. Computer program product as recited in claim 17, further comprising:

computer code for generating a video signal at a video source coupled to the digital display device by way of a link;

computer code for forming a packet based video stream based upon the video signal; and computer code for transmitting the packet based video stream to the digital display device by way of the link at the link rate.

19. Computer program product as recited in claim 18, wherein the digital display device includes a memory device coupled to the link suitably arranged to store selected ones of the video data packets.

20. Computer program product as recited in claim 19 wherein the memory device is a line buffer arranged to store at least a quantity of video data packets consistent with a single frame line.

21. Computer program product as recited in claim 20, wherein each of the video data packets includes a packet header and a packet payload, wherein the packet header includes a packet ID and wherein the packet payload includes video data suitable for driving a corresponding pixel.

* * * * *